(12) United States Patent
Kon et al.

(10) Patent No.: US 11,326,708 B2
(45) Date of Patent: May 10, 2022

(54) SOLENOID VALVE

(71) Applicant: CANON DENSHI KABUSHIKI KAISHA, Chichibu (JP)

(72) Inventors: Hisashi Kon, Chichibu (JP); Youichi Hagiwara, Chichibu (JP)

(73) Assignee: Canon Denshi Kabushiki Kaisha, Saitama (JP)

( * ) Notice: Subject to any disclaimer, the term of this patent is extended or adjusted under 35 U.S.C. 154(b) by 0 days.

(21) Appl. No.: 16/986,671

(22) Filed: Aug. 6, 2020

(65) Prior Publication Data

US 2020/0362982 A1    Nov. 19, 2020

Related U.S. Application Data

(63) Continuation of application No. PCT/JP2019/002846, filed on Jan. 29, 2019.

(30) Foreign Application Priority Data

Feb. 9, 2018    (JP) .............................. JP2018-022362

(51) Int. Cl.
*F16K 1/38* (2006.01)
*F16K 1/42* (2006.01)
*F16K 31/06* (2006.01)

(52) U.S. Cl.
CPC ............ *F16K 31/0655* (2013.01); *F16K 1/38* (2013.01); *F16K 1/42* (2013.01); *F16K 31/0634* (2013.01); *F16K 31/0696* (2013.01)

(58) Field of Classification Search
CPC ............. F16K 31/0655; F16K 31/0634; F16K 31/0696; F16K 31/06; F16K 1/38; F16K 1/42; F16K 1/425; F16K 1/465
See application file for complete search history.

(56) References Cited

U.S. PATENT DOCUMENTS

| | | | |
|---|---|---|---|
| 2,934,090 A | 4/1960 | Kenann et al. | 137/625.5 |
| 3,179,123 A | 4/1965 | Kowalski et al. | 137/495 |

(Continued)

FOREIGN PATENT DOCUMENTS

| | | |
|---|---|---|
| JP | S62-194886 U | 12/1987 |
| JP | 2000-227102 A | 8/2000 |

(Continued)

OTHER PUBLICATIONS

Translation of JP2000227102 (Year: 2021).*

(Continued)

*Primary Examiner* — Kelsey E Cary
(74) *Attorney, Agent, or Firm* — Venable LLP

(57) ABSTRACT

A solenoid valve includes an inlet port, an outlet port, a seal member arranged in a channel of a fluid between the inlet port and the outlet port and having an opening, a valve body configured to open and close the opening of the seal member, a first spring configured to bias the valve body against the seal member, electromagnetic driving device, including an umbrella-shaped movable core configured to move the valve body and an electromagnetic coil configured to attract the umbrella-shaped movable core, for operating so as to open the opening of the seal member by attracting the umbrella-shaped movable core, and a second spring configured to exert a spring force in a direction opposite to the first spring, wherein the second spring is provided with rotation preventing device.

6 Claims, 7 Drawing Sheets

(56) References Cited

U.S. PATENT DOCUMENTS

| | | | |
|---|---|---|---|
| 3,368,791 A | 2/1968 | Wells | |
| 3,472,483 A | 10/1969 | Janczur | 251/129.07 |
| 4,442,998 A | 4/1984 | Ohyama et al. | 251/129.08 |
| 4,543,983 A * | 10/1985 | Pauliukonis | F16K 31/0651 137/356 |
| 4,750,514 A * | 6/1988 | Omori | F02D 41/40 137/339 |
| 4,750,541 A * | 6/1988 | Reuter | B22D 33/00 164/338.1 |
| 4,971,290 A | 11/1990 | Dahlmann | 251/129.15 |
| 6,486,761 B1 * | 11/2002 | Czarnetzki | B60T 8/363 251/129.15 |
| 2004/0163722 A1 | 8/2004 | Cornea | 137/625.69 |
| 2006/0237064 A1 * | 10/2006 | Benson | F16K 31/0655 137/487.5 |
| 2016/0131403 A1 * | 5/2016 | Andoh | F16K 27/029 62/160 |
| 2017/0122455 A1 * | 5/2017 | Warashina | F16K 3/246 |
| 2017/0211699 A1 * | 7/2017 | Sasanuma | F16K 31/04 |

FOREIGN PATENT DOCUMENTS

| | | |
|---|---|---|
| JP | 2002-081567 A | 3/2002 |
| JP | 2008-053148 A | 3/2008 |

OTHER PUBLICATIONS

Japanese Office Action, dated Jun. 15, 2020, concerning Japanese Patent Application No. 2019-570690.
International Search Report and Written Opinion, dated Apr. 23, 2019, in corresponding parent International Application No. PCT/JP2019/002846.
Extended European Search Report dated Jan. 31, 2022 in counterpart EP Application No. 19751529.9.

\* cited by examiner

F I G. 5C
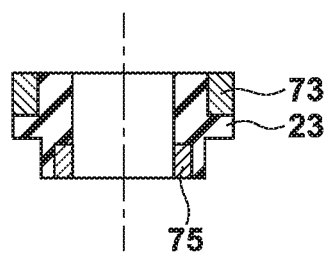
F I G. 5D
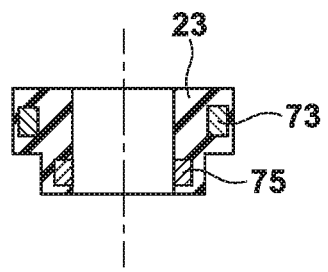

SOLENOID VALVE

CROSS-REFERENCE TO RELATED APPLICATIONS

This application is a Continuation of International Patent Application No. PCT/JP2019/002846, filed Jan. 29, 2019, which claims the benefit of Japanese Patent Application No. 2018-022362, filed Feb. 9, 2018, both of which are hereby incorporated by reference herein in their entirety.

BACKGROUND OF THE INVENTION

The present invention relates to a solenoid valve that opens and closes a channel of a pressurized fluid.

BACKGROUND ART

Conventionally, a two-way valve, three-way valve, or the like using an electromagnetic solenoid has been widely used as a valve that opens and closes a channel of a pressurized fluid. For example, PTL 1 discloses, as one type of such solenoid valves, a two-way valve that can be applied to a fluid supply valve or the like used for a pressured fluid that is used by a high-pressure washing apparatus or high-pressure fluid supply apparatus.

The structure of a conventional general two-way valve including a solenoid valve disclosed in PTL 1 will be described with reference to FIGS. 6 and 7.

FIGS. 6 and 7 are side sectional views each showing the arrangement of a conventional solenoid valve 1000. FIG. 6 shows a closed state of the solenoid valve 1000. FIG. 7 shows an open state of the solenoid valve 1000.

Referring to FIG. 6, the solenoid valve 1000 has a shaft-shaped stem 1001 extending through the center of the valve. A valve body 1003 formed on the stem 1001 is pressed against a seal member 1005 with the force of a compression coil spring 1007 to close a path from an inlet port 1009 to an outlet port 1011, thus keeping the solenoid valve 1000 in the closed state. In contrast to this, as shown in FIG. 7, when a coil 1013 is energized, the coil 1013 attracts an umbrella-shaped movable core 1015 made of a magnetic material by a distance corresponding to gap d. Accompanying this operation, a rod-shaped movable core 1017 pushes down the stem 1001 against the force of the compression coil spring 1007 to separate the valve body 1003 from the seal member 1005. This opens the path from the inlet port 1009 to the outlet port 1011 to set the solenoid valve 1000 in the open state. A weak compression coil spring 1023 is arranged between the umbrella-shaped movable core 1015 and a cover 1025 to suppress the vibration of the umbrella-shaped movable core 1015.

Note that adjusting the mounting length of the compression coil spring 1007 by rotating an adjusting screw 1019 will adjust the force with which the valve body 1003 is pressed against the seal member 1005. In addition, rotating an adjusting screw 1021 will adjust the size of the gap d between the umbrella-shaped movable core 1015 and the coil 1013, thereby stabilizing the opening/closing operation of the solenoid valve 1000.

CITATION LIST

Patent Literature

PTL 1: U.S. Pat. No. 3,368,791A

According to the arrangement disclosed in PTL 1 described above, however, when the size of the gap d varies, the suction speed varies. This sometimes reduces the operation accuracy of the solenoid valve.

The present invention has been made in consideration of the above problem and improves the operation accuracy of the solenoid valve.

SUMMARY OF THE INVENTION

A solenoid valve according to the present invention comprising: an inlet port into which a fluid flows; an outlet port from which a fluid flows; a seal member arranged in a channel of a fluid between the inlet port and the outlet port and having an opening; a valve body configured to open and close the opening of the seal member to open and close the channel; a first spring configured to bias the valve body against the seal member so as to close the opening of the seal member; electromagnetic driving device, including an umbrella-shaped movable core configured to move the valve body and an electromagnetic coil configured to attract the umbrella-shaped movable core, for operating by being energized by the electromagnetic coil so as to open the opening of the seal member by attracting the umbrella-shaped movable core and separating the valve body from the opening; and a second spring configured to exert, on the umbrella-shaped movable core, a spring force weaker than a spring force of the first spring in a direction opposite to a biasing direction of the first spring, wherein the second spring is provided with rotation preventing device for preventing the umbrella-shaped movable core from rotating with respect to the electromagnetic coil.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 5C is a view showing the arrangement of the seal member;

FIG. 5D is a view showing the arrangement of the seal member;

DESCRIPTION OF THE EMBODIMENTS

An embodiment of a solenoid valve according to the present invention will be described in detail below with reference to the accompanying drawings.

Figure 1:
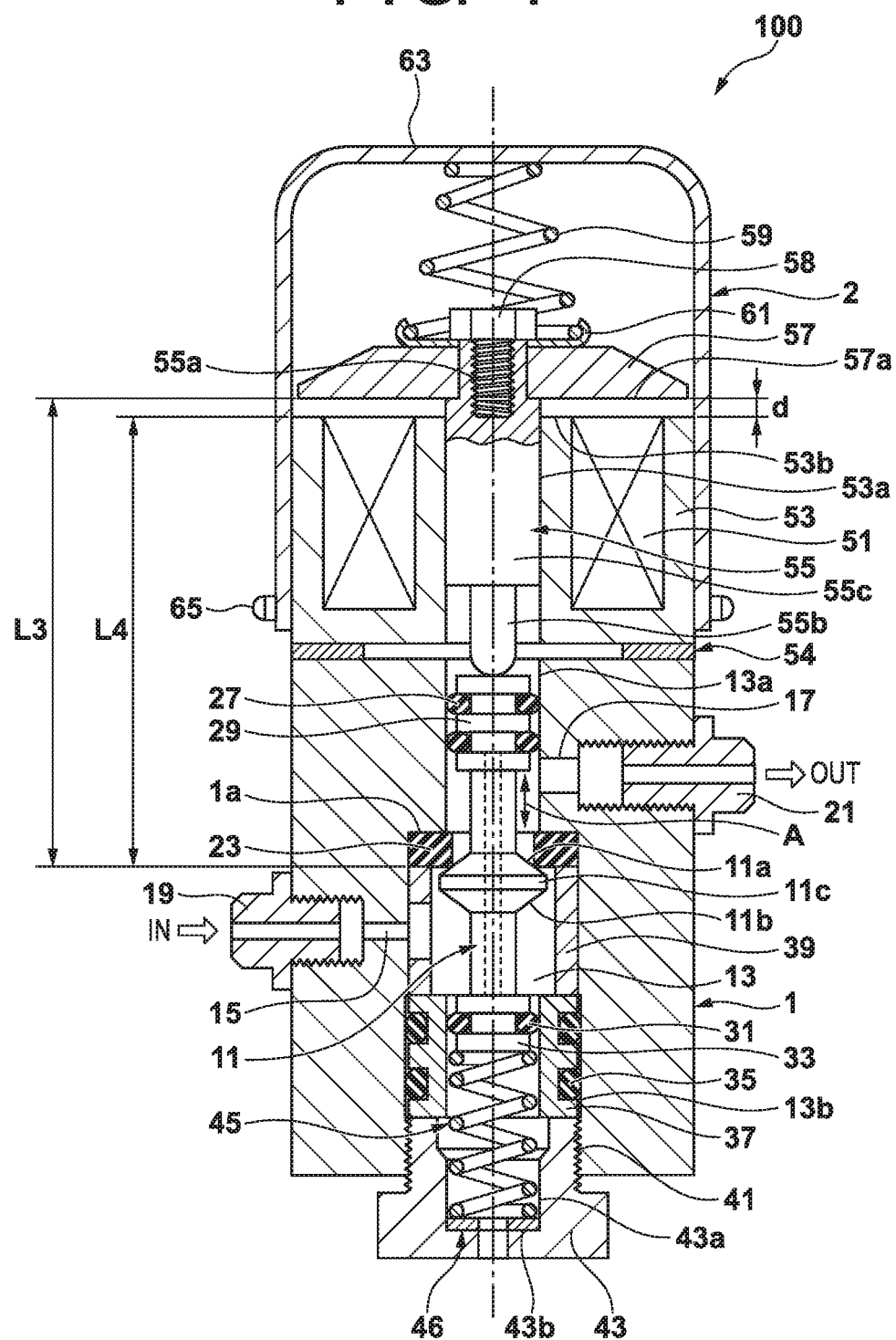
FIG. 1 is a side sectional view showing the arrangement of a solenoid valve according to an embodiment of the present invention.
Figure 2:
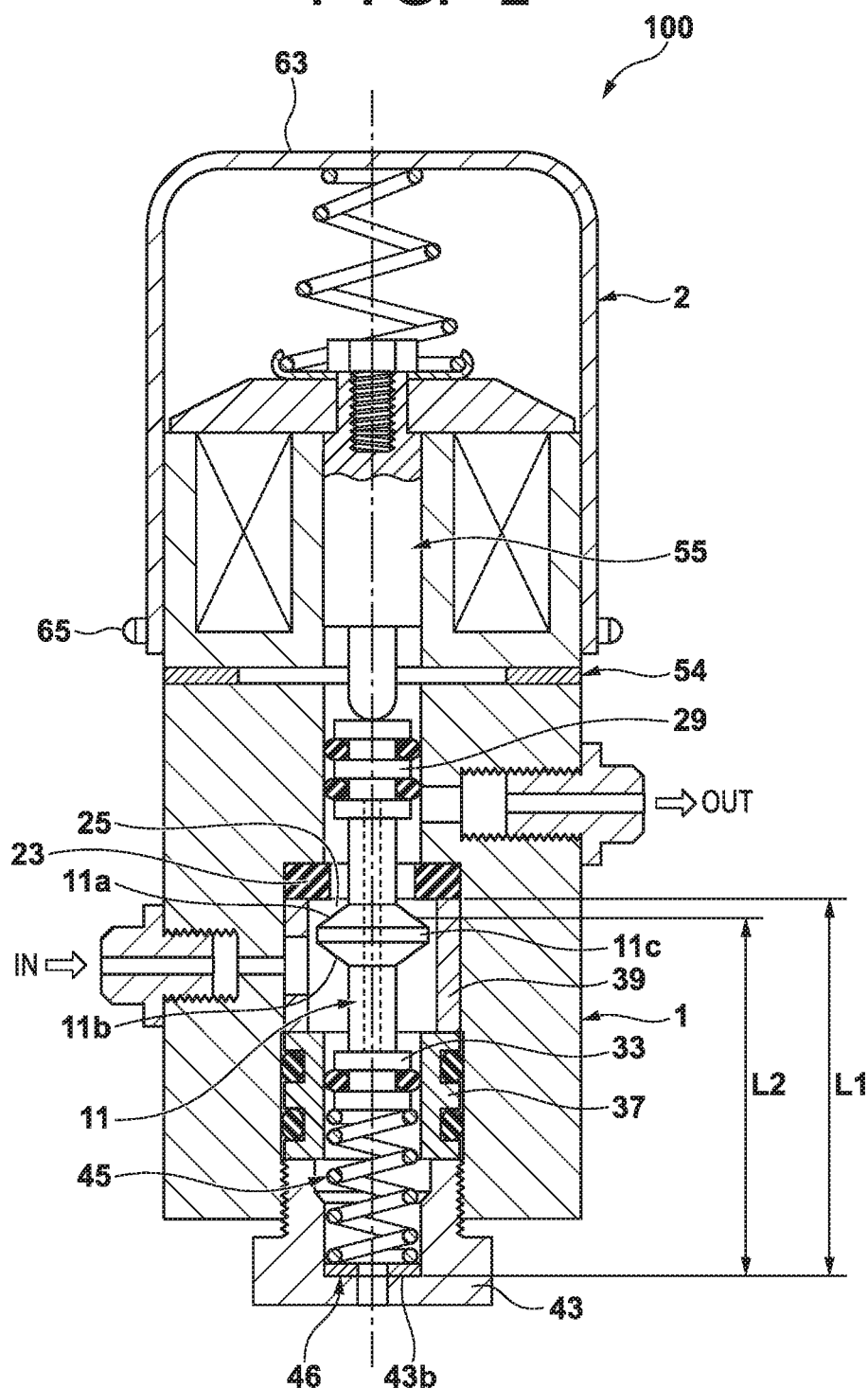
FIG. 2 is a side sectional view showing the arrangement of the solenoid valve according to the embodiment of the present invention.

FIGS. 1 and 2 are side sectional views each showing the arrangement of a solenoid valve 100 according to an embodiment of the present invention. FIG. 1 shows the closed state of the solenoid valve 100. FIG. 2 shows the open state of the solenoid valve 100. The solenoid valve 100 is a two-way valve that circulates a liquid, gas, or the like that can be used for a supply valve used for a pressurized fluid used by, for example, a high-pressure washing apparatus and a high-pressure test apparatus. Note, however, that the present invention can also be applied to a three-way valve as well as a two-way valve.

Referring to FIG. 1, the solenoid valve 100 roughly includes a housing 1 constituting the main body of the valve and an electromagnetic driving unit 2 that is fixed to the housing 1 with bolts and the like and serves to open and close the valve.

The housing 1 is formed by processing a metal such as aluminum and has a tunnel-shaped through hole 13 through which a stem 11 as a shaft that opens and closes the valve extends. A fluid such as a liquid or gas flows inside the through hole 13, and the stem 11 moves to open and close the flow.

An inlet port 15 and an outlet port 17 are formed in side portions of the housing 1. The inlet port 15 allows a fluid to flow into the through hole 13. The outlet port 17 allows the fluid to flow out from the through hole 13. Female threads are formed on the inner surfaces of the inlet port 15 and the outlet port 17. Ferrules 19 and 21 for fixing connecting pipes between a fluid source and a supply destination are fixed in these portions by being screwed.

A valve body 11c having conical tapered surfaces 11a and 11b is formed in the intermediated portion of the stem 11 on both sides of the stem 11 in a direction along the central axis (the up-down direction in FIG. 1). Although described in detail later, the electromagnetic driving unit 2 enables the stem 11 to slide in the up-down direction in FIG. 1 as indicated by an arrow A. When the stem 11 moves to the upper side, the upper tapered surface 11a of the valve body 11c is pressed against an annular seal member 23 mounted in the through hole 13, as shown in FIG. 1, thereby shutting off the flow of a fluid flowing from the inlet port 15 to the outlet port 17. That is, the solenoid valve 100 is set in the closed state. In contrast, when the stem 11 moves to the lower side, the upper tapered surface 11a of the valve body 11c separates from the seal member 23 to form a gap 25 between the seal member 23 and the valve body 11c. This forms a channel to make the fluid supplied to the inlet port 15 flow into the outlet port 17 through the gap 25, thereby setting the solenoid valve 100 in the open state.

The above description pertains to the schematic structure of the solenoid valve according to this embodiment.

Described next is a mechanism in which the electromagnetic driving unit 2 slides the stem 11 in the up-down direction indicated by the arrow A.

Referring to FIG. 1, a first piston 29 wearing an O-ring 27 for sealing is formed on the upper end portion of the stem 11. The first piston 29 slides along the inside of an upper portion 13a of the through hole 13. A second piston 33 wearing an O-ring 31 for sealing is formed on the lower end portion of the stem 11. A guide member 37 wearing an O-ring 35 for sealing is arranged in a lower portion 13b of the through hole 13. The second piston 33 slides along the inside of the guide member 37.

The guide member 37 is arranged on the seal member 23 through a sleeve 39. A female thread 41 is formed on the lower portion of the housing 1, and a fixing screw 43 for fixing the guide member 37 is screwed into the lower portion. Screwing the fixing screw 43 into the female thread 41 will press the guide member 37, the sleeve 39, and the seal member 23 against a stepped portion 1a of the housing 1, thereby fixing them.

A cylindrical space 43a is formed inside the fixing screw 43. A compression coil spring 45 is arranged in the cylindrical space 43a. The fixing screw 43 functions as a case member that positions the compression coil spring 45 that is an elastic member. The compression coil spring 45 biases an inner bottom surface 43b of the fixing screw 43 in a direction to push up the lower surface of the second piston 33 of the stem 11. Accordingly, in a natural state in which the force of the electromagnetic driving unit 2 does not act, the stem 11 is pushed up with the force of the compression coil spring 45 to the upper side in FIG. 1. As a result, the valve body 11c is pressed against the seal member 23 with the force of the compression coil spring 45 to generate a force to close the solenoid valve 100. Accordingly, the solenoid valve 100 according to this embodiment is a normal close two-way valve that is closed in a natural state. Note that an annular spacer 46 is held between the lower surface of the compression coil spring 45 and the inner bottom surface 43b of the fixing screw 43. The function of this spacer will be described later.

The electromagnetic driving unit 2 has a fixed core 53 made of a magnetic material such as iron around which a conducting wire 51 is wound in the form of a coil. Although described in detail later, the fixed core 53 is fixed to the housing 1 through a spacer 54 with bolts and the like. A through hole 53a is formed so as to extend through the central portion of the fixed core 53 in the up-down direction. A rod-shaped movable core 55 made of a nonmagnetic material which serves to push down the upper surface of the first piston 29 of the stem 11 is inserted into the through hole 53a of the fixed core 53. An umbrella-shaped movable core 57 made of a magnetic material which is attracted with the magnetic force generated in the fixed core 53 when the conducting wire 51 is energized is fixed in the upper end portion of the rod-shaped movable core 55 by press fitting. A female thread 55a is formed on the upper end portion of the rod-shaped movable core 55. Screwing a bolt 58 into the female thread 55a will fix a receiving seat 61 for receiving the bottom surface of a compression coil spring 59.

Note that a gap d is formed between a lower surface 57a of the umbrella-shaped movable core 57 and an upper surface 53b of the fixed core 53. When the conducting wire 51 is energized, the umbrella-shaped movable core 57 is attracted to the fixed core 53 and moves downward by a distance corresponding to the gap d. The force of the electromagnetic driving unit 2 which attracts the umbrella-shaped movable core 57 is set to be larger than the compression force of the lower compression coil spring 45. Accordingly, when the conducting wire 51 is energized, the umbrella-shaped movable core 57 moves downward by the distance corresponding to the gap d against the force of the compression coil spring 45, and the rod-shaped movable core 55 pushes down the stem 11 by the distance corresponding to the gap d. This separates the valve body 11c from the seal member 23 to set the solenoid valve 100 in the open state.

A bottomed cylindrical cover (cover member) 63 is mounted on the outside of the fixed core 53 of the electromagnetic driving unit 2 so as to cover the electromagnetic driving unit 2 and is fixed to the fixed core 53 with screws 65 and the like. The compression coil spring 59 biases the umbrella-shaped movable core 57 against the cover 63 with a force weaker than that pushes up the lower compression coil spring 45. That is, the compression coil spring 59 exerts a weak force on the umbrella-shaped movable core 57 in a direction opposite to the biasing direction of the compression coil spring 45. This makes the compression coil spring 59 prevent the vibration of the umbrella-shaped movable core 57 without pushing down the umbrella-shaped movable core 57 against the force of the compression coil spring 45.

Figure 3A:
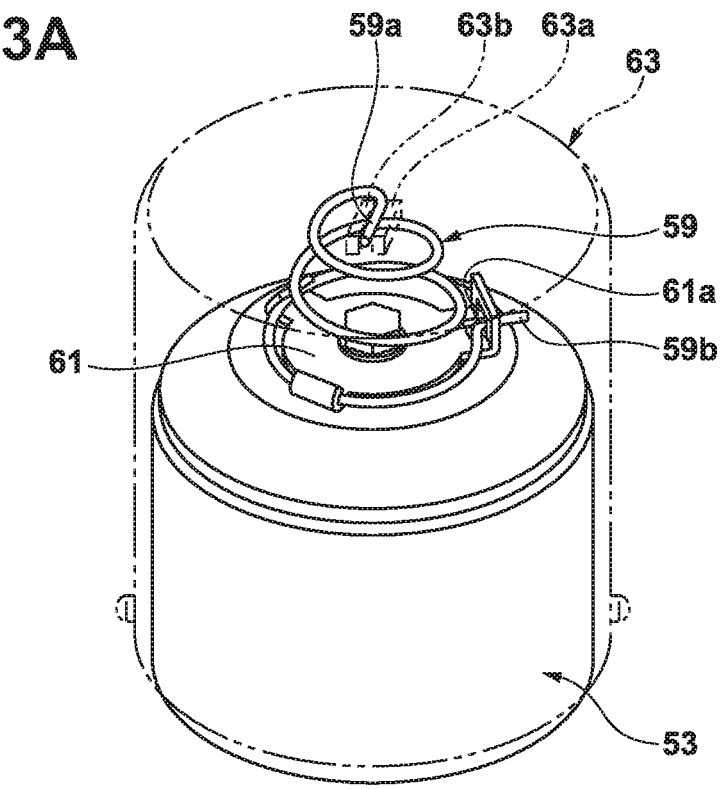
FIG. 3A is a view showing the removed compression coil spring portion of an electromagnetic driving unit.
Figure 3B:
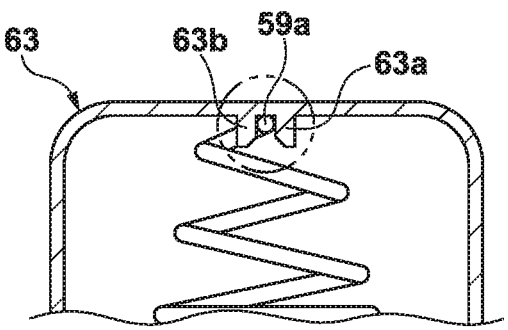
FIG. 3B is a view showing the removed compression coil spring portion of the electromagnetic driving unit.
Figure 3C:
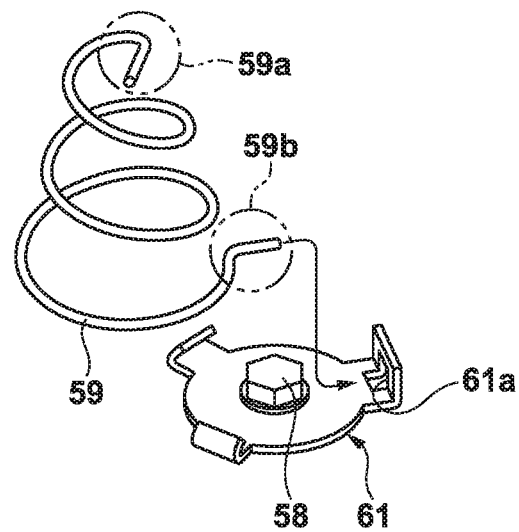
FIG. 3C is a view showing the removed compression coil spring portion of the electromagnetic driving unit.

The compression coil spring 59 described above will be described in more detail below. FIGS. 3A to 3C are views each showing an extracted portion on which the compression coil spring 59 of the electromagnetic driving unit 2 is mounted. FIG. 3A is a view showing the compression coil spring 59 mounted on the umbrella-shaped movable core 57 through the receiving seat 61 when viewed from obliquely above. FIG. 3B is a view showing the compression coil spring 59 when viewed from a side. FIG. 3C is a view showing how the compression coil spring 59 is assembled.

Referring to FIGS. 3A to 3C, the compression coil spring 59 is wound in the form of an almost circular cone such that the bottom portion has a large diameter and gradually decreases in diameter upward. A first locking portion 59a inwardly bent from the circumference of the coil is formed at one end portion of the coil which comes into contact with this circular conical top portion. A pair of protruding portions 63a and 63b are formed on the ceiling surface of the cover 63 so as to sandwich the first locking portion 59a from both sides. As shown in FIG. 3B, the first locking portion 59a of the compression coil spring 59 is sandwiched between the pair of protruding portions 63a and 63b to inhibit the rotation of the compression coil spring 59 with respect to the cover 63.

A second locking portion 59b outwardly bent from the circumference of the coil is formed at the proximal end portion (the other end portion) of the compression coil spring 59. The plate-shaped receiving seat 61 is partly bent upward, and a locking hole 61a is formed in the bent portion. As shown in FIG. 3C, inserting the second locking portion 59b of the compression coil spring 59 into the locking hole 61a will prevent the umbrella-shaped movable core 57 from rotating with respect to the compression coil spring 59 through the receiving seat 61.

As a result, the first and second locking portions 59a and 59b of the compression coil spring 59, the pair of protruding portions 63a and 63b of the cover 63, and the locking hole 61a prevent the umbrella-shaped movable core 57 from rotating with respect to the cover 63, eventually, with respect to the fixed core 53.

Figure 6:
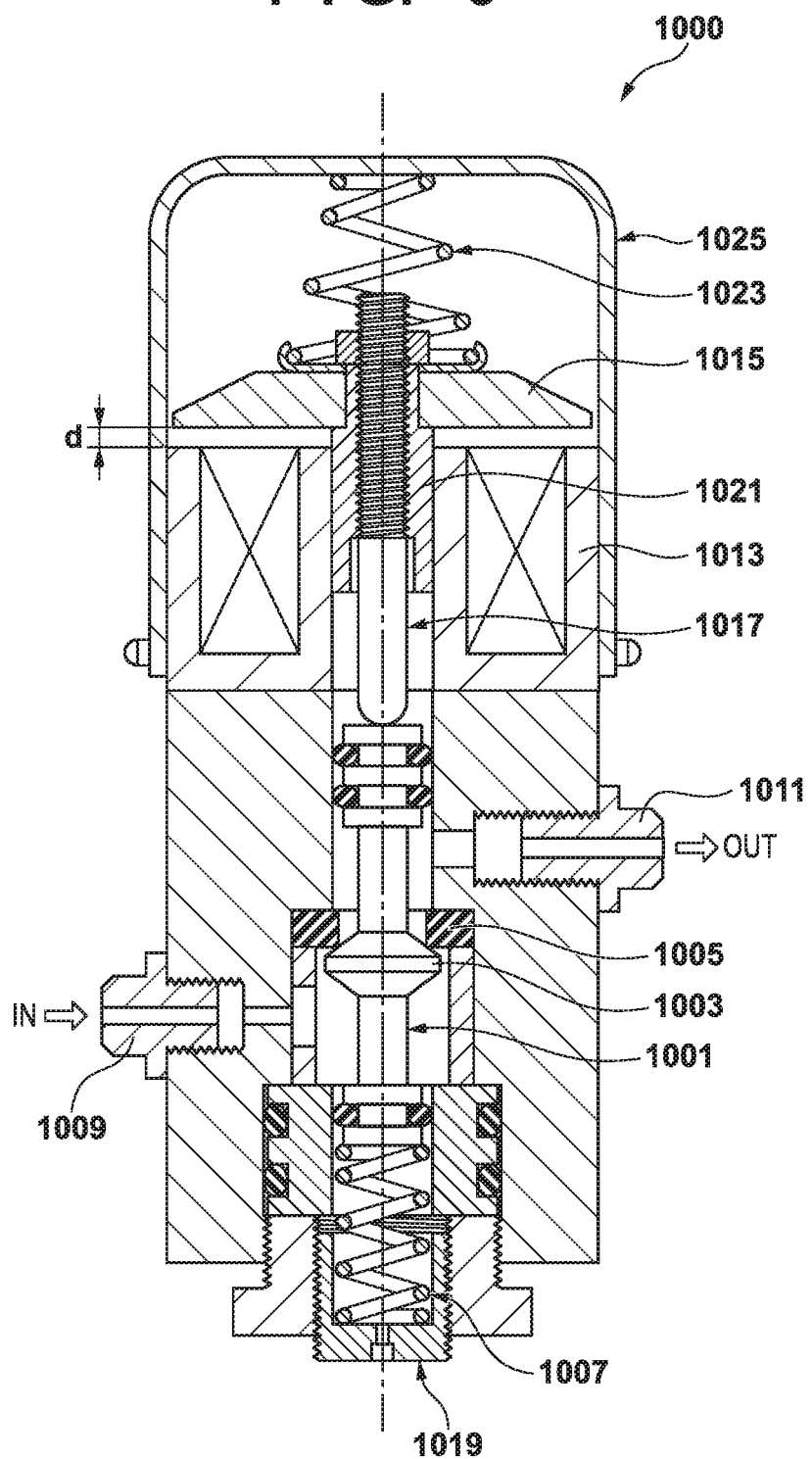
FIG. 6 is a side sectional view showing the arrangement of a conventional solenoid valve.
Figure 7:
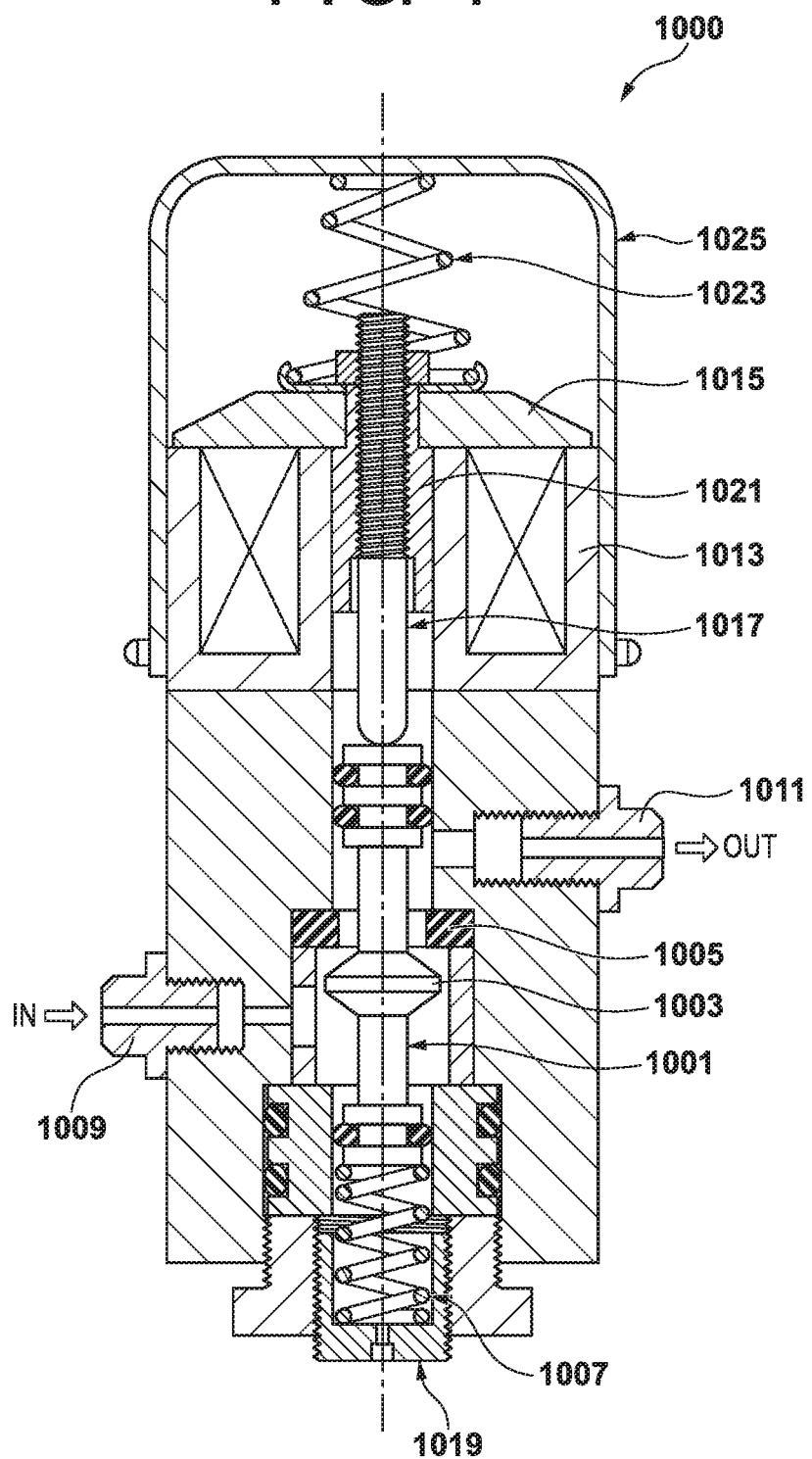
FIG. 7 is a side sectional view showing the arrangement of the conventional solenoid valve.

As described in the "BACKGROUND ART" part, the conventional solenoid valve 1000 shown in FIG. 6 has no structure for preventing the umbrella-shaped movable core 1015 from rotating with respect to the coil 1013 (core). There is originally a slight gap between the outer diameter of the rod-shaped movable core 1021 of the umbrella-shaped movable core 1015 and the inner diameter of the through hole of the core so as to allow the rod-shaped movable core 1021 to slide. The umbrella-shaped movable core 1015 sometimes slightly tilts with respect to the core by an amount corresponding to the gap. If the umbrella-shaped movable core 1015 further rotates with respect to the core in this state, the size of the gap d between the umbrella-shaped movable core 1015 and the core varies, thus sometimes causing variations in operation and attraction timing when the umbrella-shaped movable core is attracted to the core.

In contrast to this, according to this embodiment, as described above, the first and second locking portions 59a and 59b of the compression coil spring 59, the pair of protruding portions 63a and 63b of the cover 63, and the locking hole 61a prevent the umbrella-shaped movable core 57 from rotating with respect to the fixed core 53, and hence it is possible to accurately and stably control the operation and the attraction timing when the umbrella-shaped movable core 57 is attracted to the fixed core 53.

In addition, the proximal end portion of the rod-shaped movable core 55 which is fixed to the umbrella-shaped movable core 57 by press fitting is formed into a large-diameter portion 55c by being made thicker than a distal end portion 55b of the rod-shaped movable core 55. The distal end portion 55b and the large-diameter portion 55c of the rod-shaped movable core 55 are integrally formed. Forming the proximal end portion thick in this manner will reduce the tilt of the rod-shaped movable core 55 with respect to the fixed core 53 assuming that the gap and the fitting length remain the same when the rod-shaped movable core 55 is fitted in the fixed core 53. This stabilizes the operation of attracting the umbrella-shaped movable core 57 to the fixed core 53. Note that that surface of the inner surface of the through hole 53a of the fixed core 53 which slides with the large-diameter portion 55c is plated with nickel so as to implement smooth sliding.

As described above, when, for example, a solenoid valve is used as a pressurized fluid supply valve, the accuracy of the timing of opening/closing the valve needs to be extremely high. For this reason, as described in the "BACKGROUND ART" part, the conventional solenoid valve is configured such that the mounting length of the compression coil spring 1007 by which the valve body 1003 is pressed against the seal member 1005 is adjusted with the adjusting screw 1019. Theoretically, adjusting this mounting length will uniform the force with which the valve body is pressed against the seal member, thereby accurately controlling the timing of opening/closing the solenoid valve. In practice, however, this adjustment is very delicate, and hence it is very difficult to uniform the characteristics of a plurality of solenoid valves. In addition, adjustment sometimes changes. This inevitably causes a certain degree of error in the timing of opening/closing the valve in the conventional structure. This embodiment uses a structure for solving this problem.

As shown in FIG. 2, in this embodiment, the respective components are manufactured by accurately managing dimensional precision instead of adjusting the mounting length of the compression coil spring 45 with the adjusting screw. The dimensions of the manufactured components are then actually measured, and a total dimensional error caused by the tolerance accumulation of the respective components is then adjusted by inserting the spacer 46 between the lower surface of the compression coil spring 45 and the inner bottom surface (support surface) 43b of the fixing screw 43.

More specifically, a dimension L1 from the inner bottom surface 43b of the fixing screw 43 on which the compression coil spring 45 is seated to that surface of the seal member 23 with which the valve body 11c is in contact is equal to the sum of the dimension from the inner bottom surface 43b of the fixing screw 43 to the upper end of the fixing screw 43, the dimension of the guide member 37 in the longitudinal direction, and the dimension of the sleeve 39 in the longitudinal direction. A total dimension is acquired by measuring the dimensions of the respective components. Also measured is a dimension L2 from the lower surface of the second piston 33 with which the compression coil spring 45 comes into contact to a point at which the valve body 11c comes into contact with the seal member 23. The thickness of the spacer 46 is adjusted in accordance with these dimensions such that the mounting length of the compression coil spring 45 falls within an error of about 0.05 mm with respect to, for example, a design value.

In this embodiment, when the tolerances of the respective components described above are accumulated, a dimensional error of, for example, about 0.3 mm at maximum occurs. Accordingly, six types of spacers are prepared, which differ in thickness from, for example, 0.05 mm to 0.3 mm in increments of 0.05 mm. An optimal spacer is selected from the six types of spacers based on the actually measured dimensional values of the respective components described above and inserted between the lower surface of the compression coil spring 45 and the inner bottom surface 43b of the fixing screw 43. This makes it possible to accurately set the mounting length of the compression coil spring 45. This adjustment will not change afterward.

Figure 4:
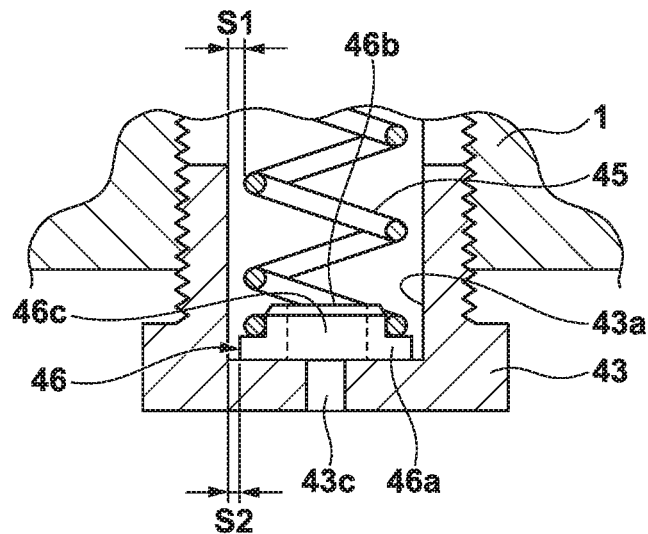
FIG. 4 is an enlarged view of the spacer of the compression coil spring.

FIG. 4 is a view showing the actual shape of the spacer 46.

As shown in FIG. 4, the spacer 46 has a disk-shaped outer peripheral portion 46a and a central portion 46b protruding upward in a columnar shape. The outer peripheral portion of the central portion 46b is chamfered to facilitate fitting of the inner peripheral surface of the compression coil spring 45. The inner peripheral surface of the compression coil spring 45 is guided by the central portion 46b of the annular spacer 46 to position the compression coil spring 45 in the center of the inside of the disk-shaped space 43a (inside the space) so as to form a gap S1 between the outer peripheral portion of the compression coil spring 45 and the cylindrical space 43a of the fixing screw 43. The gap S1 is set to be larger than a space S2 between the outer peripheral portion 46a of the spacer 46 and the cylindrical space 43a. This prevents, for example, the loss of force and the occurrence of dust by sliding between the outer peripheral surface of the compression coil spring 45 and the inner peripheral surface of the cylindrical space 43a when the compression coil spring 45 expands and contracts. Dust is a serious problem for a high-accuracy solenoid valve. The above arrangement according to this embodiment can effectively prevent the generation of dust. This can also prevent the loss of force of the compression coil spring 45. Note that when the outer diameter of the central portion 46b of the spacer 46 is set to be slightly larger than the inner diameter of the compression coil spring 45 and the central portion 46b is press-fitted in the inner periphery of the compression coil spring 45, components can be assembled while the spacer 46 and the compression coil spring 45 are integrated with each other, thereby improving the assemblability.

Note that a through hole 46c is formed in the central portion of the spacer 46, and a through hole 43c is formed in the bottom surface of the fixing screw 43. This arrangement is configured to escape the pressure in the cylindrical space 43a.

A further arrangement of this embodiment which is configured to improve the accuracy of the timing of opening/closing the valve will be described by referring back to FIG. 1.

In the conventional solenoid valve shown in FIG. 6, as described in the "BACKGROUND ART" part, rotating the adjusting screw 1021 will adjust the size of the gap d between the umbrella-shaped movable core 1015 and the coil 1013 and adjust the timing of opening/closing the solenoid valve 1000. Theoretically, adjusting the gap d should accurately control the timing of opening/closing the solenoid valve. However, with this adjustment, it is also very difficult to uniform the characteristics of a plurality of solenoid valves. In addition, the adjustment sometimes changes.

As shown in FIG. 1, in this embodiment, the respective components are manufactured by accurately managing the dimensional accuracy of the components instead of adjusting the gap d between the umbrella-shaped movable core 57 and the fixed core 53 with the adjusting screw. The dimensions of the manufactured components are then actually measured, and a total dimensional error caused by the tolerance accumulation of the respective components is then adjusted by inserting the spacer 54 between the lower surface of the fixed core 53 and the upper surface of the housing 1.

More specifically, a dimension L3 from a point at which the valve body 11c comes into contact with the seal member 23 to the lower surface 57a of the umbrella-shaped movable core 57 is equal to the sum of the dimension from a point at which the valve body 11c comes into contact with the seal member 23 to the upper surface of the first piston 29 and the dimension from the distal end of the rod-shaped movable core 55 to the mounting stepped portion of the umbrella-shaped movable core 57. Measuring the dimensions of the respective components will obtain the total dimension of this portion. Also measured is the dimension from the lower surface of the seal member 23 to the upper surface of the fixed core 53. With respect to these dimensions, the thickness of the spacer 54 is adjusted such that the dimension of the gap d falls within an error of about 0.05 mm.

In this embodiment, when the tolerances of the respective components described above are accumulated, a dimensional error of, for example, 0.3 mm at maximum occurs. Accordingly, six types of spacers are prepared, which differ in thickness from, for example, 0.05 mm to 0.3 mm in increments of 0.05 mm. An optimal spacer is selected from the six types of spacers based on the actually measured dimensional values of the respective components described above and inserted between the lower surface of the fixed core 53 and the upper surface of the housing 1. This makes it possible to accurately set the size of the gap d between the lower surface 57a of the umbrella-shaped movable core 57 and the upper surface of the fixed core 53. This adjustment will not change afterward.

In this embodiment, adjustment is performed by means of the dimensional accuracy of the components and the spacers in the above manner to reduce the time and effort for adjustment and prevent the adjustment from changing afterward.

FIGS. 5A to 5D are views each showing the structure of the seal member 23 in FIG. 1.

Figure 5A:
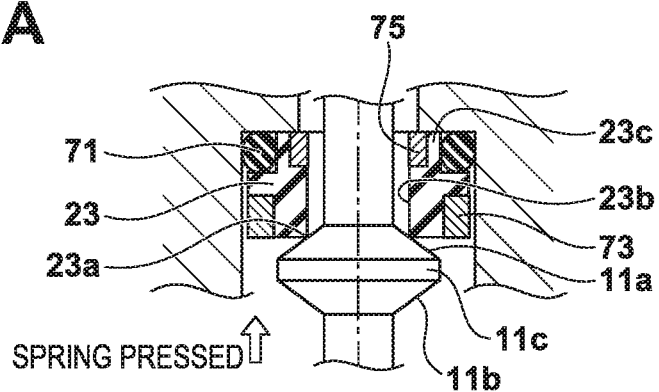
FIG. 5A is a view showing the arrangement of a seal member.
Figure 5B:
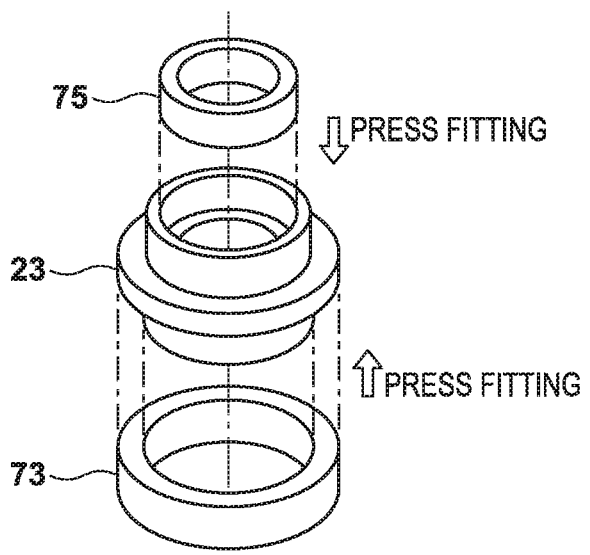
FIG. 5B is a view showing the arrangement of the seal member.

The seal member 23 is generally formed from a resin material such as nylon to improve the sealing performance when coming into contact with the valve body 11c. As shown in FIG. 5A, because the tapered surface 11a of the valve body 11c is pressed against a lower portion 23a of the seal member 23, a force (internal pressure) to spread an opening 23b is exerted on the lower portion 23a of the seal member 23. In addition, because an upper portion 23c of the seal member 23 has an O-ring 71 for sealing mounted on the outer peripheral portion, a force (external pressure) is exerted on the upper portion 23c to press it from outside to inside. For this reason, in order to ensure the airtightness of the seal member 23, a first metal ring 73 is generally mounted on the outer peripheral portion of the lower portion of the seal member 23, and a second metal ring 75 is generally arranged in the inner peripheral portion of the upper portion of the seal member 23 so as to prevent the deformation of the seal member 23 by reinforcing it. As shown in FIG. 5B, conventionally, the metal rings 73 and 75 are attached to the seal member 23 by press fitting. For this reason, when these components are press-fitted, the seal member 23 tends to deform and the metal rings tend to tilt. This sometimes causes a deterioration in the accuracy of each component.

In contrast to this, in this embodiment, as shown in FIG. 5C, the seal member 23, which is a resin portion, and the first and second metal rings 73 and 75 are integrally molded by insert molding. This makes it possible to manufacture a seal member with high accuracy without causing deformation or tilt by press-fitting. In addition, because the seal member 23 can be manufactured with high accuracy, that point on the valve body 11c which comes into contact with the seal member 23 is accurately positioned, thereby accurately setting the size of the gap d shown in FIG. 1. This stabilizes the attracting operation of the fixed core 53 with respect to the umbrella-shaped movable core 57, thus solving problems such as the shift of the attraction timing.

When the seal member 23 is integrally molded, the first and second metal rings can be completely covered with a resin material, as shown in FIG. 5D.

As described above, according to the above embodiment, the compression coil spring that suppresses the vibration of the umbrella-shaped movable core is provided with the rotation locking portions for preventing the rotation of the umbrella-shaped movable core to improve the stability of the operation of attracting the umbrella-shaped movable core to the electromagnetic coil.

Adjusting the mounting length of the spring that presses the valve body against the seal member by using the spacer can accurately adjust the spring force without requiring any fine adjustment. In addition, this prevents the adjustment from changing afterward.

Adjusting the gap between the umbrella-shaped movable core and the coil by using the spacer will stabilize the operation of attracting the coil to the umbrella-shaped movable core without requiring any fine adjustment. In addition, this also prevents the adjustment from changing afterward.

Integrally molding the seal member with the metal rings will prevent the deformation or tilt of the components by press-fitting, thereby improving the accuracy of the seal member.

Providing the large-diameter portion on the proximal end portion of the rod-shaped movable core will reduce the tilt of the rod-shaped movable core. This stabilizes the dimension of the gap between the umbrella-shaped movable core and the coil, thereby stabilizing the attracting operation.

The features of the above embodiment can be summarized as follows.

[1] Provided is a solenoid valve (100) that includes a coil spring (59) between an umbrella-shaped movable core (57) and a cover member (63) covering a fixed core (53) of an electromagnetic coil that drives the umbrella-shaped movable core (57) coupled to the rod-shaped movable core (55) that pushes a valve body (11c), with the fixed core (53) being provided on a housing (1), characterized in that the coil spring (59) has a mounting portion that links movement between the cover (63) and the umbrella-shaped movable core (57).

[2] Provided is a solenoid valve (100) in which a fixed core (53) of an electromagnetic coil that drives an umbrella-shaped movable core (57) coupled to a rod-shaped movable core (55) that pushes a valve body (11c) is mounted on a housing (1), characterized in that the rod-shaped movable core (55) has, inside the fixed core (53), a large-diameter portion (55c) having a larger diameter than a distal end portion (55b) that pushes the valve body (11c).

[3] Provided is a solenoid valve (100) in which a fixed core (53) of the electromagnetic coil that drives an umbrella-shaped movable core (57) coupled to a rod-shaped movable core (55) that pushes a valve body (11c) is mounted on a housing (1) and a case member (43) accommodating an elastic member (45) that moves the valve body (11c) up and down is mounted in the housing (1), characterized in that the case member (43) is directly fixed to the housing (1) and a spacer (43b) is provided below the elastic member (45).

[4] Provided is a solenoid valve (100) in which a fixed core (53) of an electromagnetic coil that drives an umbrella-shaped movable core (57) coupled to a rod-shaped movable core (55) that pushes a valve body (11c) is mounted on a housing (1), characterized in that the rod-shaped movable core (55) and the umbrella-shaped movable core (57) are fixed by press fitting, and a spacer (54) is provided between the fixed core (53) and the housing (1).

[5] Provided is a solenoid valve (100) that includes a seal member (23) provided above the valve body (11c) that is operated up and down by an elastic member (45), with a fixed core (53) of an electromagnetic coil that drives an umbrella-shaped movable core (57) coupled to a rod-shaped movable core (55) that pushes a valve body (11c) being mounted on a housing (1), characterized in that a seal member (23) is configured by assembling a resin ring (23c) that comes into contact with the valve body (11c), an outer metal ring (73) outside a portion that comes into contact with the valve body (11c), and an inner metal ring (75) arranged inside an O-ring (71) arranged above the outer metal ring (73), and the outer metal ring (73) and the inner metal ring (75) are integrally molded from the resin material that forms the resin ring (23c).

Although the respective features described above each can independently stabilize the gap between the umbrella-shaped movable core and the coil, the use of a combination of the features can further stabilize an attracting operation. In particular, combining [3] and [4] described above can obtain a higher effect based on measurement results on the respective components.

Each effect described above makes it possible to accurately control the timing of opening/closing the solenoid valve.

According to the present invention, it is possible to improve the operation accuracy of the solenoid valve.

The present invention is not limited to the above embodiments and various changes and modifications can be made within the spirit and scope of the present invention. Therefore, to apprise the public of the scope of the present invention, the following claims are made.

What is claimed is:

1. A solenoid valve comprising:
a housing in which an inlet port into which a fluid flows and an outlet port from which the fluid flows are formed;
a seal member arranged in a channel of the housing between the inlet port and the outlet port and having an opening;
a valve body configured for movement along a center line thereof to open and close the opening of the seal member to open and close the channel;
an elastic member configured to bias the valve body against the seal member so as to close the opening of the seal member; and
an electromagnetic driving device configured to move the valve body, the electromagnetic driving device having a movable core that moves the valve body, an electromagnetic coil that attracts the movable core, and a fixed core having a contact surface where the movable core is attracted and abuts when the electromagnetic coil is energized,
wherein when a direction in which the valve body moves and closes the opening is a vertical direction, the electromagnetic driving device is fixed to an upper surface of the housing with a first spacer interposed therebetween and wherein a shape of the first spacer overlaps with a shape of the contact surface when viewed along a direction of the center line of the valve body,
wherein the elastic member is contained in a case member fixed to the housing,
wherein a second spacer, which contacts with the elastic member, is held between a lower surface of the elastic member and the case member fixed to a lower portion of the housing, and
wherein a shape of the second spacer overlaps with a shape of a taper surface of the valve body functioning as a valve when viewed along a direction of the center line of the valve body.

2. The solenoid valve according to claim 1, wherein the second spacer is formed as a ring shape and the first spacer is formed as a ring shape, and wherein the inner diameter of the first spacer is larger than that of the second spacer.

3. The solenoid valve according to claim 1, wherein a screw is formed on an outer surface of the case member, and the case member is fixed to a lower surface of the housing by the screw.

4. A solenoid valve comprising:
a housing in which an inlet port into which a fluid flows and an outlet port from which the fluid flows are formed;
a seal member arranged in a channel of the housing between the inlet port and the outlet port and having an opening;
a valve body configured to open and close the opening of the seal member to open and close the channel;
an elastic member configured to bias the valve body against the seal member so as to close the opening of the seal member; and
an electromagnetic driving device configured to move the valve body,
wherein the seal member is formed from a resin material and includes a first metal ring on an outer peripheral portion of a portion in a moving direction of the valve body and a second metal ring on an inner peripheral portion of a portion different from that of the first metal ring in a moving direction of the valve body, and the resin portion and the first and second metal rings are integrally molded by insert molding, wherein the elastic member is contained in a case member fixed to the housing, and wherein a spacer, which contacts with the elastic member, is held between a lower surface of the elastic member and the case member fixed to a lower portion of the housing.

5. A solenoid valve comprising:
a housing in which an inlet port into which a fluid flows and an outlet port from which the fluid flows are formed;
a seal member arranged in a channel of the housing between the inlet port and the outlet port and having an opening;
a valve body configured for movement along a center line thereof to open and close the opening of the seal member to open and close the channel;
an elastic member configured to bias the valve body against the seal member so as to close the opening of the seal member; and
an electromagnetic driving device configured to move the valve body,
wherein the elastic member is contained in a case member that is fixed to the housing, wherein a spacer is arranged between the elastic member and the case member and wherein a shape of the spacer overlaps with a shape of a taper surface functioning as a valve when viewed along a direction of the center line of the valve body,
wherein the electromagnetic driving device includes a movable core configured to move the valve body and an electromagnetic coil configured to attract the movable core, and operates by being energized by the electromagnetic coil so as to open the opening of the seal member by attracting the movable core and separating the valve body from the opening,
wherein the electromagnetic driving device includes a second elastic member configured to exert, on the movable core, a spring force weaker than a spring force of the elastic member in a direction opposite to a biasing direction of the elastic member,
wherein the second elastic member is provided with a rotation preventing device for preventing the movable core from rotating with respect to the electromagnetic coil, and
wherein the second elastic member is a coil spring, and the rotation preventing device includes a first bent portion formed by inwardly bending one end portion of the coil spring from a circumference of a coil and a second bent portion formed by outwardly bending the other end portion of the coil spring from the circumference of the coil.

6. The solenoid valve according to claim 5, further comprising a cover member covering the electromagnetic coil,
wherein the cover member includes a first locking portion configured to lock the first bent portion and the movable core includes a second locking portion configured to lock the second bent portion, and
wherein the first locking portion has a pair of projection portions which sandwich the first bent portion.

* * * * *